United States Patent
Kim et al.

(10) Patent No.: US 7,745,958 B2
(45) Date of Patent: Jun. 29, 2010

(54) TACT SWITCH MODULE EXECUTING TOGGLING FLOW AND POWER SWITCHING MODULE INCLUDING THE TACT SWITCH MODULE

(75) Inventors: Jong Pal Kim, Seoul (KR); Kun Soo Shin, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 11/979,641

(22) Filed: Nov. 6, 2007

(65) Prior Publication Data

US 2008/0150371 A1 Jun. 26, 2008

(30) Foreign Application Priority Data

Dec. 20, 2006 (KR) .................. 10-2006-0130816

(51) Int. Cl.
*G06F 13/40* (2006.01)
(52) U.S. Cl. ..................................... 307/134
(58) Field of Classification Search ............... 307/112, 307/134

See application file for complete search history.

(56) References Cited

U.S. PATENT DOCUMENTS

| 6,178,513 | B1 | 1/2001 | Lee |
| 7,466,040 | B2 * | 12/2008 | Bruwer ................... 307/116 |
| 2004/0027400 | A1 * | 2/2004 | Ryu et al. .................. 347/5 |

FOREIGN PATENT DOCUMENTS

| JP | 2000-123689 | 4/2000 |
|---|---|---|
| JP | 2000-357436 | 12/2000 |
| JP | 2001-56730 | 2/2001 |
| JP | 2001-332149 | 11/2001 |
| JP | 2002-93283 | 3/2002 |
| KR | 93-18728 | 8/1993 |
| KR | 1994-004253 | 2/1994 |
| KR | 95-34294 | 12/1995 |
| KR | 1998-018324 | 7/1998 |
| KR | 1999-008538 | 2/1999 |
| KR | 1999-0031713 | 5/1999 |
| KR | 1999-0024779 | 7/1999 |
| KR | 2000-0004270 | 1/2000 |
| KR | 2000-0013117 | 7/2000 |

(Continued)

OTHER PUBLICATIONS

Korean Notice Of Allowance dated May 21, 2008, issued in corresponding Korean Patent Application No. 10-2006-0130816.

*Primary Examiner*—Albert W Paladini
*Assistant Examiner*—Carlos Amaya
(74) *Attorney, Agent, or Firm*—Staas & Halsey LLP

(57) ABSTRACT

A tact switch module is provided. The tact switch module includes a tact switch to control a driving voltage to be supplied to a power supply by sensing an ON input by a user; and a power control unit having a power input port which is connected to the power supply and a power output port to output a first voltage when power is supplied to the power input port, wherein the driving voltage triggers the power supply to output the power, and the power supply supplies the power to the power input port while the first voltage is supplied from the power output of the power control unit.

12 Claims, 2 Drawing Sheets

FOREIGN PATENT DOCUMENTS

| | | |
|---|---|---|
| KR | 2000-0014487 | 7/2000 |
| KR | 20-0218850 | 1/2001 |
| KR | 20-0236945 | 6/2001 |
| KR | 2001-0056497 | 7/2001 |
| KR | 10-2005-0073736 | 7/2005 |
| KR | 10-2006-0095166 | 8/2006 |
| KR | 10-2006-0099178 | 9/2006 |

* cited by examiner

TACT SWITCH MODULE EXECUTING TOGGLING FLOW AND POWER SWITCHING MODULE INCLUDING THE TACT SWITCH MODULE

CROSS-REFERENCE TO RELATED APPLICATIONS

This application claims the priority benefit of a Korean Patent Application No. 10-2006-0130816, filed on Dec. 20, 2006, in the Korean Intellectual Property Office, the entire disclosure of which is hereby incorporated by reference.

BACKGROUND

1. Field

Exemplary embodiments relate to a tact switch module executing a toggling flow and a power switching module including the tact switch module. More particularly, exemplary embodiments relate to a tact switch module executing a toggling flow which can control ON/OFF modes of power of a circuit, including the tact switch, by just a single touch, without continuously pushing the tact switch, and a power switching module including the tact switch.

2. Description of the Related Art

A tact switch is generally used to control functions of electronic products. The tact switch may be separately equipped on a main substrate as a single component, or a terminal of the tact switch may be equipped on the main substrate of the electronic products, according to a type of the tact switch. The former case is generally used when a size of the electronic products is so large that there is enough space for equipping the tact switch, and the latter case is generally used when a size of the electronic products is so thin and small that there is not enough space for equipping the tact switch.

A portable device (portable terminal) such as a mobile terminal, a mobile phone, a personal digital assistant (PDA), an MP3 player, and a Digital Multimedia Broadcasting (DMB) terminal tends to be slimmer and lighter in order to improve portability. Accordingly, for a switch for users' operation, the tact switch is quite suitable for the tendency of the slimness and lightness of the circuit in the portable device.

However, there is a disadvantage in the tact switch, in that the user is required to continuously push the tact switch in order to switch ON/OFF modes of power of the portable device since the tact switch operates to maintain its connection only when the user continuously pushes the tact switch.

Thus, there is need for a new tact switch module, which can switch ON/OFF modes of the power of the portable devices by just a single touch without continuously pushing the tact switch, can contribute to slimness and lightness of the circuit, and can contribute to convenience for the user.

SUMMARY

In an aspect of exemplary embodiments, exemplary embodiments address at least the above problems and/or disadvantages and provide at least the advantages described below. Accordingly, an aspect of exemplary embodiments is to provide a tact switch module and a power switching module including the tact switch module which can control ON/OFF modes of power of a circuit including the tact switch by just a single touch, without continuously pushing the tact switch.

An aspect of exemplary embodiments also provides a tact switch module and a power switching module including the tact switch module which can contribute to slimness and lightness of a portable device by embodying a switch module, enabling a user to control ON/OFF modes of power, as the tact switch module, and by embodying the tact switch module as one of a configuration of the portable terminal.

According to an aspect of exemplary embodiments, there is provided a tact switch module including a tact switch to control a driving voltage to be supplied to a power supply by sensing an ON input by a user; and a power control unit having a power input port which is connected to the power supply and a power output port to output a first voltage when power is supplied to the power input port, wherein the driving voltage triggers the power supply to output the power, and the power supply supplies the power to the power input port while the first voltage is supplied from the power output of the power control unit.

According to another aspect of exemplary embodiments, there is provided a power switching module including a power supply; a tact switch to control a driving voltage to be supplied to the power supply by sensing an ON-input by a user; a power control unit having a power input port which is connected to the power supply and a power output port to output a first voltage when power is supplied to the power input port, wherein the power supply supplies the power to the power input port while the first voltage is supplied from the power output of the power control unit, and wherein the driving voltage triggers the power supply so that the power supply outputs the power.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1A:
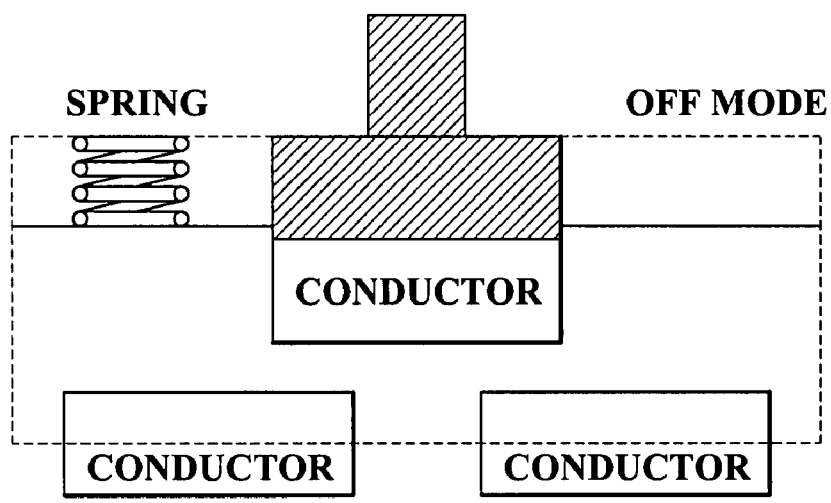
FIGS. 1A and 1B illustrate ON/OFF operation of a tact switch according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

Figure 1B:
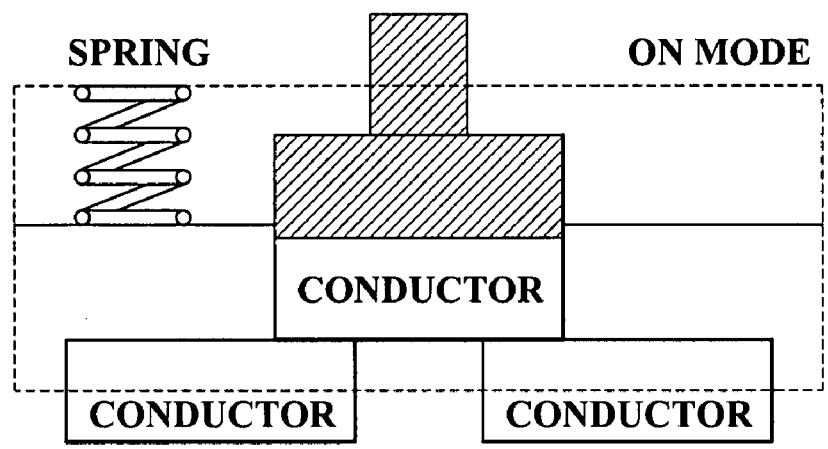

FIGS. 1A and 1B illustrate ON/OFF operation of a tact switch according to an exemplary embodiment.

FIG. 1A illustrates an OFF mode of the tact switch, and FIG. 1B illustrates an ON mode of the tact switch. As illustrated in FIG. 1A, when there is no touch by a user, each conductor of the tact switch maintains a predetermined space from each other, and subsequently the tact switch may maintain the OFF mode.

As illustrated FIG. 1B, when the user pushes the tact switch, each conductor of the tact switch becomes contacted to each other, and subsequently a circuit, where the tact switch is equipped, may be changed to the ON mode. In this instance, the ON mode may be maintained only when each conductor contacts to each other, i.e. only when the user continuously touches the tact switch. Accordingly, when the user does not touch the tact switch, the circuit, where the tact switch is equipped, is changed to the OFF mode.

A tact switch module and a power switching module including the tact switch according to an exemplary embodiment may include a general tact switch as illustrated in FIGS.

1A and 1B. In this instance, the tact switch module and the power switching module including the tact switch module may maintain the circuit as the ON mode by just a single touch due to internal operation of the circuit, without continuously touching the tact switch.

Hereinafter, a configuration and operation of the tact switch module and the power switching module including the tact switch module according to an exemplary embodiment will be described in detail by referring to FIG. 2.

Figure 2:
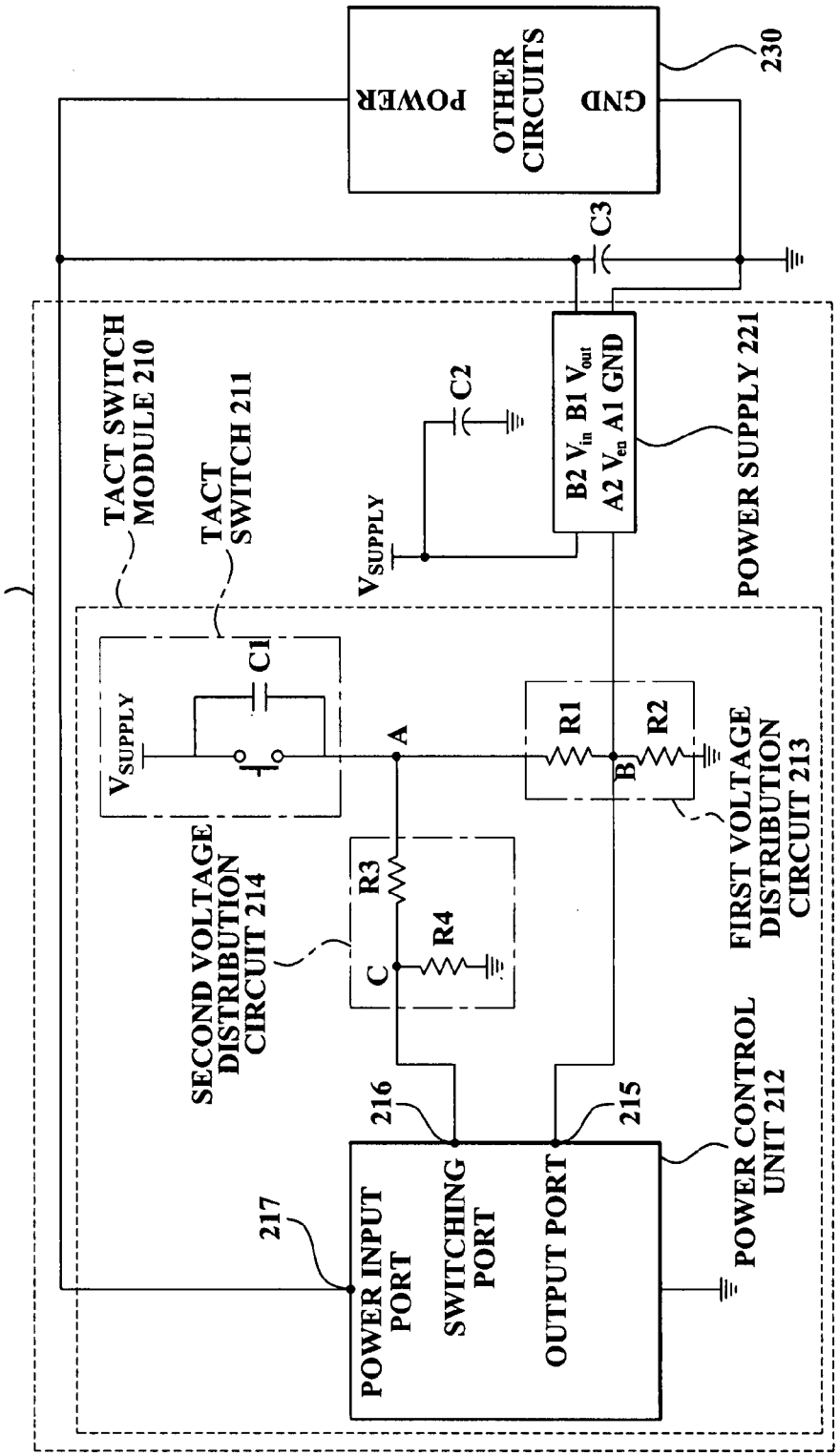
FIG. 2 illustrates a configuration of a tact switch and a power switching module, which includes the tact switch module according to an exemplary embodiment.

FIG. 2 illustrates a configuration of a tact switch module 210 and a power switching module 220 including the tact switch module 210 according to an exemplary embodiment.

The tact switch module 210 and the power switching module 220 according to an exemplary embodiment are illustrated in FIG. 2. The power switching module 220 includes the tact switch module 210 which includes a power supply 221. In this specification, both the configuration and operation of the tact switch module 210 and the power switching module 220 will be described together.

The tact switch module 210 includes a tact switch 211, a power control unit (power controller) 212, a first voltage distribution circuit 213, and a second voltage distribution circuit 214. Also, as described above, the power switching module 220 according to an exemplary embodiment may further include the power supply 221 in addition to the above described configuration of the tact switch module 210. The power switching module 220 includes the tact switch 211, the power control unit 212, the first voltage distribution circuit 213, the second voltage distribution circuit 214, and the power supply 221.

The tact switch 211 controls a driving voltage to be supplied to the power supply 221 by sensing an ON input by a user. Specifically, when the user pushes the tact switch 211 to input ON to the tact switch module 210, the tact switch 211 supplies the predetermined driving voltage to the power supply 221. The user may push the tact switch 211 with a single touch.

The tact switch 211 may include a predetermined voltage supply to supply the driving voltage. When the predetermined voltage supply is not included in the tact switch 211, the tact switch 211 may control a predetermined circuit connection, so that the driving voltage is supplied from an external voltage to the power supply 221.

The driving voltage supplied via the tact switch 211 may be partially supplied to the power supply 221 via the first voltage distribution circuit 213. The first voltage distribution circuit 213 supplies a portion of the driving voltage to the power supply 221. The first voltage distribution circuit 213 according to an exemplary embodiment may include a first resistance R1 and a second resistance R2. The first resistance R1 and the second resistance R2 are serially connected with each other to configure the first voltage distribution circuit 213.

Accordingly, the driving voltage may be dropped by a predetermined voltage according to the first resistance R1 and the second resistance R2, and supplied to the power supply 221. As an example, when the driving voltage is $V_{supply}$, a voltage V to be supplied to the power supply 221 is as follows:

$$V = V_{supply} \times R2/(R1+R2).$$

In this instance, the voltage V to be supplied to the power supply 221 may be established to be greater than a voltage, which is required by the power supply 221 to start to supply power to the power control unit 212 and an external circuit 230. For this, the first resistance R1 and the second resistance R2 of the first voltage distribution circuit 213 may be variously established depending on a determination of those skilled in the art when designing a tact switch according to an exemplary embodiment.

The driving voltage triggers the power supply 221 to output power to the power control unit 212 and the external circuit 230. Specifically, the power supply 221, supplied with the voltage V via the first voltage distribution circuit 213, outputs the power to the power control unit 212 and the external circuit 230.

The power control unit 212 includes a switching port 216. The switching port 216 includes a power input port 217, which is connected to the power supply 221, a power output port 215 which outputs a first voltage when power is inputted to the power input port 217, and a switching port 216 which controls HIGH/LOW switching of the output port 215.

The power control unit 212 is supplied with power, which is outputted from the power supply 221 via the power input port 217. After being supplied with the power, the power control unit 212 on an OFF mode is switched to an ON mode. The power control unit 212 switches the output port 215 to HIGH after being supplied with the power via the power input port 217 and the switching to the ON mode. Namely, the power control unit 212 outputs the first voltage to the power supply 221 via the output port 215.

The first voltage may be established to be greater than a voltage required by the power supply 221 to start to supply power to the power control unit 212 and an external circuit 230. The power supply 221 supplied with the first voltage continuously supplies the power to the power input port 217 of the power control unit 212 while the first voltage is supplied to the power supply 221.

As described above, when there is the ON input by the user, and when the tact switch 211 supplies the driving voltage to the power supply 221 via the first voltage distribution circuit 213, the power supply 221 outputs the power to the power control unit 212, the power control unit 212 supplied with the power continuously supplies the first voltage to the power supply 221, the power supply 221 continuously supplies the power to the power control unit 212 while the first voltage is supplied, consequently the tact switch module 210 and the power switching module 220 can maintain the ON mode and supply the power to the external circuit 230 even when the user touches the tact switch 211 once.

The power supply 221 may terminate the outputting of the power when the power control unit 211 no longer supplies the first voltage. Specifically, when the output port 215 of the power control unit 211 switches to LOW, the tact switch module 210 and the power switching module 220 may be switched to the OFF mode. Namely, the switching port 216 controls HIGH/LOW of the output port 215. The power control unit 212 may switch the output port 215 to LOW when power supplied from a second power distribution circuit 214 via the switching port 216, is greater than a threshold voltage.

Specifically, when there is the OFF input by the user, a portion of the driving voltage supplied from the tact switch 211 may be supplied to the switching port 216 of the power control unit 212 via the second voltage distribution circuit 214. Namely, the second voltage distribution circuit 214 supplies the portion of the driving voltage to the switching port 216.

The second voltage distribution circuit 214 according to an exemplary embodiment may include a third resistance R3 and a fourth resistance R4. The third resistance R3 and the fourth resistance R4 are serially connected to each other, and may configure the second voltage distribution circuit 214.

Accordingly, the driving voltage may be dropped by a predetermined voltage according to the first resistance R3 and the second resistance R4, and supplied to the switching port 216. As an example, when the driving voltage is $V_{supply}$, a voltage $V_s$ to be supplied to the switching port 216 is as follows;

$$V_s = V_{supply} \times R4/(R3+R4)$$

In this instance, the voltage $V_s$ to be supplied to the switching port 216 may be established to be greater than a voltage, which is required by the power control unit 212 to switch the output port 215 to LOW.

However, when the output port 212 is switched to LOW, and the tact switch module 210 becomes to be an OFF mode while a user is touching the tact switch of the tact switch unit 211 to input an OFF-input, a voltage $V_s$ is supplied to the switching port 216 again since the user is still touching the tact switch, thereby occurring an error, that is the tact switch module 210 is switched to an ON mode.

Thus, to prevent the error, when the tact switch unit 211 in an ON mode receives an OFF-input from the user, the power control unit 212 may be operated to ignore a voltage, which is inputted to the switching port 216 for a predetermined delay time. The predetermined delay time is generally established as a greater than a time of touching the tact switch. Also, the power control unit 212 may switch the output port 215 to LOW after the predetermined delay time passes.

Also, the power control unit 212 may control a point of time when the user touches and pulls out of the tact switch using flickering of the LED. Specifically, the power control unit 212 lights the LED when the user touches the tact switch, the LED is extinguished after two seconds, thereby inducing the user to pull out of the tact switch. In this instance, the power control unit 212 ignores a voltage being inputted to the switching port 216 for two seconds, and switches the output port 215 to LOW after two seconds passes, thereby preventing the error.

As described above, when there is the OFF input by the user, the tact switch 211 supplies the driving voltage to the switching port 216 of the power control unit 212 via the second voltage distribution circuit 214, the power control unit 212 compares the supplied power with the predetermined threshold voltage, switches the output port 212 to LOW when the supplied power is greater than the threshold value, consequently the tact switch module 210 and the power switching module 220 may be switched to OFF mode.

Conversely, a case that the driving voltage is supplied to the switching port 216 via the second voltage distribution circuit 214 also occurs when there is the ON input by the user. Specifically, when the user inputs ON, the driving voltage of the tact switch 211 is supplied to the power supply 221 via the first voltage distribution circuit 213, and simultaneously supplied to the switching port 216 of the power control unit 215 via the second voltage distribution circuit 214.

In the above case, an error may occur in the tact switch module 210 and the power switching module 220, i.e. as soon as the tact switch module 210 and the power switching module 220 switch to ON mode, the tact switch module 210 and the power module 220 switch to an OFF mode. In order to prevent the error, the power control unit 215 may continuously maintain LOW during a predetermined delay time of the switching port 216. Namely, when the power control unit 215 switches from an OFF mode to an ON mode, the power control unit 215 may be programmed not to switch the switching port 216 to LOW by comparing a voltage, which is supplied to the switching port 216 during the predetermined delay time, with a threshold value. The predetermined delay time may be established to be as long as the time the user touches the tact switch, and immediately pulls out of the tact switch for the ON-input. The power control unit 212 may be embodied as a predetermined microcontroller unit (MCU).

As described above, when there is the ON-input by the user, the tact switch module 210 and the power switching module 220 may continuously maintain the ON mode even when the user touches the tact switch, and immediately pulls out of the tact switch.

When the ON mode is maintained, the driving voltage from the tact switch is no longer supplied, the first voltage is continuously supplied from the output port 215 of the power control unit 212 to the power supply unit 221.

The first voltage is supplied to the power supply 221, and simultaneously supplied to the first voltage distribution circuit 213. Namely, the first voltage may be supplied to a node B of the first voltage distribution circuit 213.

The first voltage, which is supplied to the node B of the first voltage distribution circuit 213, may be supplied to the switching port 216 of the power control unit 212 by the first voltage distribution 213 and the second voltage distribution circuit 214. Specifically, the first voltage, which is supplied to the node B of the first voltage distribution circuit 213, may be dropped by the first resistance R1 of the first voltage distribution circuit 213, the third resistance R3 of the second voltage distribution circuit 214, and the fourth resistance R4, and subsequently may be supplied to the switching port 216.

When a voltage of the dropped first voltage to be supplied to the switching port 216 is greater than the threshold voltage that the power control unit 212 determines LOW switching of the output port 215, an error may occur.

Accordingly, when the tact switch module 210 and the power switching module 220 maintain the ON mode, the first resistance R1, the third resistance R3, and the fourth resistance R4 may be respectively established, so that the voltage of the dropped first voltage to be supplied to the switching port 216 is less than the threshold value.

Hereinafter, ON/OFF operation of the tact switch module 210 and the power switching module 220 according to an exemplary embodiment will be described by taking the first resistance R1 and the second resistance R2 of the first voltage distribution circuit 213, and the third resistance R3 and the fourth resistance R4 of the second voltage distribution circuit 214 as an example.

For convenience of description, an example that the driving voltage supplied from the tact switch module 210 is 4.2 V when there is the ON/OFF inputs by the user, a threshold voltage of the power supply 221 is 1.5 V, a threshold voltage of the switching port 216 of the power control unit 212 is 0.5 V, a voltage of the output port 215 of the power control unit 212 is 3 V, R1 is 1 MΩ, R2 is 1 MΩ, R3 is 10 KΩ, and R4 is 100 KΩ will be taken.

When there is the ON input by the user, since a driving voltage of 4.2 V is supplied from the tact switch module 210, a voltage of 4.2 V is supplied to a node A. Also, a voltage of 2.1 V is supplied to the node B due to serial connection of the R1 and the R2. Accordingly, a voltage of 2.1 V is supplied to the power supply 221.

The power supply 221 outputs power to the power input port 217 of the power control unit 212 since the supplied voltage 2.1 V is greater than the threshold voltage 1.5 V. Simultaneously, power is outputted to the external circuit 230.

The power control unit 212 supplies the power via the power input port 217 outputs a voltage of 3 V via the output port 215. Accordingly, the power supply 221 continuously outputs the power since the voltage of 3 V is supplied to the power supply 221.

Also, the voltage of 3 V of the voltage of the output port 215 is supplied to the B node. In this instance, since the driving voltage 4.2 V is no longer supplied from the tact switch 211, a voltage 0.27 V is supplied to a node C according to the voltage of 3 V on the node B.

The power control unit 212 continuously outputs the voltage of the 3 V by the output port 212 since the voltage of 0.27 V supplied to the switching port 216 is less than the threshold value 0.5 V.

When there is the OFF input by the user under the ON mode of the tact switch module 210 and the power switching module 220, the tact switch 211 supplies the driving voltage of 4.2 V. Accordingly, the driving voltage of 4.2 V is supplied to the node A. A voltage of approximately 3.8 V is supplied to the node C according to the driving voltage 4.2 V, supplied to the node A, therefore a voltage supplied to the switching port 216 of the power control unit 212 is approximately 3.8 V.

The power control unit 212 no longer outputs the voltage of 3 V since the voltage of approximately 3.8 V supplied to the switching port 216 is greater than the threshold voltage. Now that the voltage of 3 V is no longer outputted, the outputting of the power to the power control unit 212 and the external circuit 230 is also cut off, and consequently the tact switch module 210 and the power switching module 220 may become the OFF mode.

As described above, consumption of a power resource can be reduced by cutting-off the power to the power control unit 212 which controls a power supply to the tact switch module 210 and the power switching module 220 when the tact switch module 210 and the power switching module 220 are on the OFF mode.

Also, user convenience, slimness, and lightness of a portable device, including the tact switch module 210 and the power switching module 220, can be improved by configuring the tact switch module 210 and the power switching module 220 using the tact switch 211 which can control ON/OFF switching of the power.

A tact switch module and a power switching module including the tact switch module according to an exemplary embodiment, ON/OFF modes of power of a circuit including the tact switch can be controlled by just a single touch, without continuously pushing the tact switch.

Also, a power switching module including a tact switch module and a power switching module, including the tact switch module, according to exemplary embodiments, slimness and lightness of a portable device can be improved by embodying a switch module, enabling a user to control ON/OFF modes of power, with the tact switch module, and by embodying the tact switch module and the portable terminal as one in a configuration of the portable terminal.

Although a few exemplary embodiments have been shown and described, it would be appreciated by those skilled in the art that changes may be made in these exemplary embodiments, the scope of which is defined in the claims and their equivalents.

What is claimed is:

1. A tact switch module comprising:
   a tact switch to control a driving voltage to be supplied to a power supply by sensing an ON/OFF input by a user; and
   a power control unit having a power input port which is connected to the power supply, a power output port to output a first voltage when power is supplied to the power input port, and a switching port to control HIGH/LOW switching of the output port and switch the output port to the LOW when a voltage greater than a predetermined threshold voltage is supplied to the switching port,
   wherein the driving voltage triggers the power supply to output the power, and the power supply supplies the power to the power input port while the first voltage is supplied from the power output of the power control unit, and
   wherein the power control unit ignores the power, which is inputted to the switching port, during the predetermined delay time when the tact switch module senses, from an ON mode, an OFF-input by a user, and the power control unit switches the output port to a LOW after a predetermined delay time passes.

2. The tact switch module of claim 1, further comprising:
   a first voltage distribution circuit to supply a portion of the driving voltage supplied by the tact switch to the power supply; and
   a second voltage distribution circuit to supply a portion of the driving voltage to the switching port,
   wherein the voltage greater than the threshold voltage is supplied to the switching port by the second power distribution circuit when there is the OFF input by the user, and the output port of the power control unit is switched to the LOW.

3. The tact switch module of claim 1, further comprising:
   a first voltage distribution circuit which is connected to the output port of the power control unit and the power supply; and
   a second voltage distribution circuit which is connected to the first voltage distribution circuit and the switching port of the power control unit,
   wherein the first voltage distribution circuit and the second voltage distribution circuit distribute the first voltage, so that a voltage, which is inputted to the switching port, is less than the threshold voltage.

4. The tact switch module of claim 1, wherein the power control unit is a predetermined microcontroller unit, and the power control unit is programmed so that the switching port ignores an input during the predetermined delay time.

5. The tact switch module of claim 1, wherein the power control unit controls an alarm signal to be provided to the user via a predetermined display unit or a sound output unit, and wherein the alarm signal indicates that the tact switch module performs an OFF line mode during the delay time.

6. A portable device comprising the tact switch module of claim 1.

7. A power switching module comprising:
   a power supply;
   a tact switch to control a driving voltage to be supplied to the power supply by sensing an ON/OFF-input by a user;
   a power control unit having a power input port which is connected to the power supply, a power output port which to output a first voltage when power is supplied to the power input port, and a switching port to control HIGH/LOW switching of the output port and switch the output port to the LOW when a voltage greater than a predetermined threshold voltage is supplied to the switching port,
   wherein the power supply supplies the power to the power input port while the first voltage is supplied from the power output of the power control unit,
   wherein the driving voltage triggers the power supply so that the power supply outputs the power, and
   wherein the power control unit ignores the power, which is inputted to the switching port, during the predetermined delay time when the tact switch module senses, from an ON mode, an OFF-input by a user, and the power control unit switches the output port to the LOW after the predetermined delay time passes.

8. The power switching module of claim 7, further comprising:
- a first voltage distribution circuit to supply a portion of the driving voltage, supplied by the tact switch to the power supply; and
- a second voltage distribution circuit to supply a portion of the driving voltage to the switching port,
- wherein the voltage greater than the threshold voltage is supplied to the switching port by the second power distribution circuit when there is the OFF-input by the user, and the output port of the power control unit is switched to the LOW.

9. The power switching module of claim 7, further comprising:
- a first voltage distribution circuit which is connected to the output port of the power control unit and the power supply; and
- a second voltage distribution circuit which is connected to the first voltage distribution circuit and the switching port of the power control unit,
- wherein the first voltage distribution circuit and the second voltage distribution circuit divide the first voltage, so that power, which is inputted to the switching port, is less than the threshold value.

10. The power switching module of claim 7, wherein the power control unit is a predetermined microcontroller unit, and the power control unit is programmed so that the switching port ignores an input during the predetermined delay time.

11. The power switching module of claim 7, wherein the power control unit controls an alarm signal to be provided to the user via a predetermined display unit or a sound output unit, and
- wherein the alarm signal indicates that the tact switch module performs an OFF line mode during the delay time.

12. A portable device comprising the power switching module of claim 7.

* * * * *